United States Patent [19]

Ionescu et al.

[11] Patent Number: 5,018,058
[45] Date of Patent: May 21, 1991

[54] HIGH FREQUENCY AC VOLTAGE CONTROL

[75] Inventors: Adrian F. Ionescu, Patchogue; Theodore Conant, New York, both of N.Y.

[73] Assignee: Power Management International, Inc., Chappaqua, N.Y.

[21] Appl. No.: 548,686

[22] Filed: Jul. 5, 1990

[51] Int. Cl.$^5$ ............................................. H02M 5/45
[52] U.S. Cl. ........................................ 363/34; 363/37; 363/95
[58] Field of Search ................ 363/15, 17, 34, 37, 363/95, 98, 132, 136

[56] References Cited

U.S. PATENT DOCUMENTS

| | | | |
|---|---|---|---|
| 4,024,451 | 5/1977 | Nishino et al. | 363/35 |
| 4,210,956 | 7/1980 | Watanabe | 363/35 |
| 4,328,454 | 5/1982 | Okuyama et al. | 363/37 |
| 4,816,985 | 3/1989 | Tanahashi | 363/37 |
| 4,827,151 | 5/1989 | Okado | 363/37 |
| 4,843,246 | 6/1989 | Tanaka | 363/37 |
| 4,942,511 | 7/1990 | Lipo et al. | 363/37 |

Primary Examiner—Steven L. Stephan
Assistant Examiner—Jeffrey Sterrett
Attorney, Agent, or Firm—Edward H. Loveman

[57] ABSTRACT

This voltage control apparatus produces distortionless, stabilized alternating output voltage subject to distortion. The apparatus comprises a wave form reshaping circuit connected to the voltage output for energizing a load, and an internal reference voltage generator amplitude stabilized and synchronized with the input voltage. An error detector generates error pulses which are applied to a controller to generate control pulses. The control pulses are combined with the amplified reshaped input voltage to produce the stabilized, distortionless voltage output. An overcurrent sensor applies signals to the controller to cut off the voltage output when the load draws excessive current. The reference voltage generator can be adjustable to vary the amplitude of the alternating voltage output.

12 Claims, 5 Drawing Sheets

HIGH FREQUENCY AC VOLTAGE CONTROL

BACKGROUND OF THE INVENTION

1. Field of the Invention

This invention relates to a solid state, high frequency switching AC line voltage control apparatus, and more particularly concerns such apparatus adapted for controllably varying the alternating voltage output of the apparatus and/or stabilizing the alternating voltage output applied to a load.

2. Description of the Prior Art

Currently available AC voltage stabilizers of the electromagnetic type have large sizes and heavy weights. They introduce a considerable amount of distortion to stabilize the AC output voltage. They are extremely sensitive to variations in the frequency of the AC line input voltage, and have a very limited line regulation range, usually between 95 volts and 135 volts. They may sustain extended overload or output short circuits without material damage to themselves, but they will then dissipate large amounts of power as heat.

Another type of AC voltage stabilizer is a motor driven variac in a closed loop control circuit. This type of AC voltage stabilizer has the disadvantages of large size, heavy weight, slow response time to variations of the AC line voltage, and a low reliability factor. The slow response time is especially dangerous for the load if the AC line voltage increases sharply to an unacceptable high value. Unless an external protective device such as a reliable fuse or circuit breaker is employed, the motor driven variac cannot sustain an overload or output short circuit without being destroyed by excessive current.

An autoselected multiple tap transformer is another type of prior AC voltage stabilizer, where stabilization is accomplished in steps, rather than continuously as done by the motor driven variac. This type of AC voltage stabilizer is also large and heavy and unable to avoid damage in the event of an overload or output short circuit.

The variac employs a variable voltage transformer. This variac has a coil wound on a laminated iron core. A tap is connected to the AC line input voltage and a sliding wiper makes contact with a bare, uninsulated area of the winding. A variable output voltage appears between one end of the winding connected to the AC line input voltage and the wiper. This variac is manually controlled and like other variacs is large in size and very heavy.

Another type of motor driven variac is one where in an electric motor controls the position of the wiper moving along a winding to vary the output voltage. This variac like the others mentioned above has the disadvantages of large size and heavy weight, slow response time, and a low reliability factor, since mechanical components are employed for AC voltage control. If this variac does not have reliable external protection devices such as fuses or circuit breakers, this type of variac is subject to destruction by excessive currents due to overload or output short circuit. This type of variac is not employed in a closed feedback loop, and does not have a stabilized output.

SUMMARY OF THE INVENTION

It is a principal object of the present invention to provide a solid state, high frequency switching AC voltage control apparatus which avoids the difficulties and disadvantages of prior voltage control devices. The present new voltage control apparatus is adapted for stabilizing the voltage output applied to a load, and it may be further adapted for controllably varying the voltage output of the apparatus.

According to the invention the voltage control apparatus comprises a wave form reshaping circuit connected to the load, and an output error detector circuit, voltage controlled, pulsed, and amplitude modulated at high frequency by the AC line input voltage. The apparatus further includes a bipolar stepped-up switching power supply.

According to the invention, the voltage contol apparatus for producing stabilized AC output voltage, comprises a wave form reshaping circuit connected to the load, and an internal sinusoidal reference voltage generator which is amplitude stabilized and frequency and phase synchronized with the AC line input voltage, an error detector between the internal reference voltage generator and the load voltage, a load overcurrent sensor; and a controller responsive to the overcurrent sensor to cut off the alternating output voltage. The apparatus is also adapted to controllably vary the AC output voltage, in addition to the stabilizing function above mentioned, by means of an internally variable reference voltage derived from the AC line input voltage.

The new apparatus primarily employs solid state components which are very small in size and light in weight. It employs an internal high frequency step-up transformer which is quite small and light in weight as compared with the massive electromagnetic components of prior AC voltage stabilizers and variacs. It has built in overload self-protection features so that reliance on external circuit breakers are not required.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
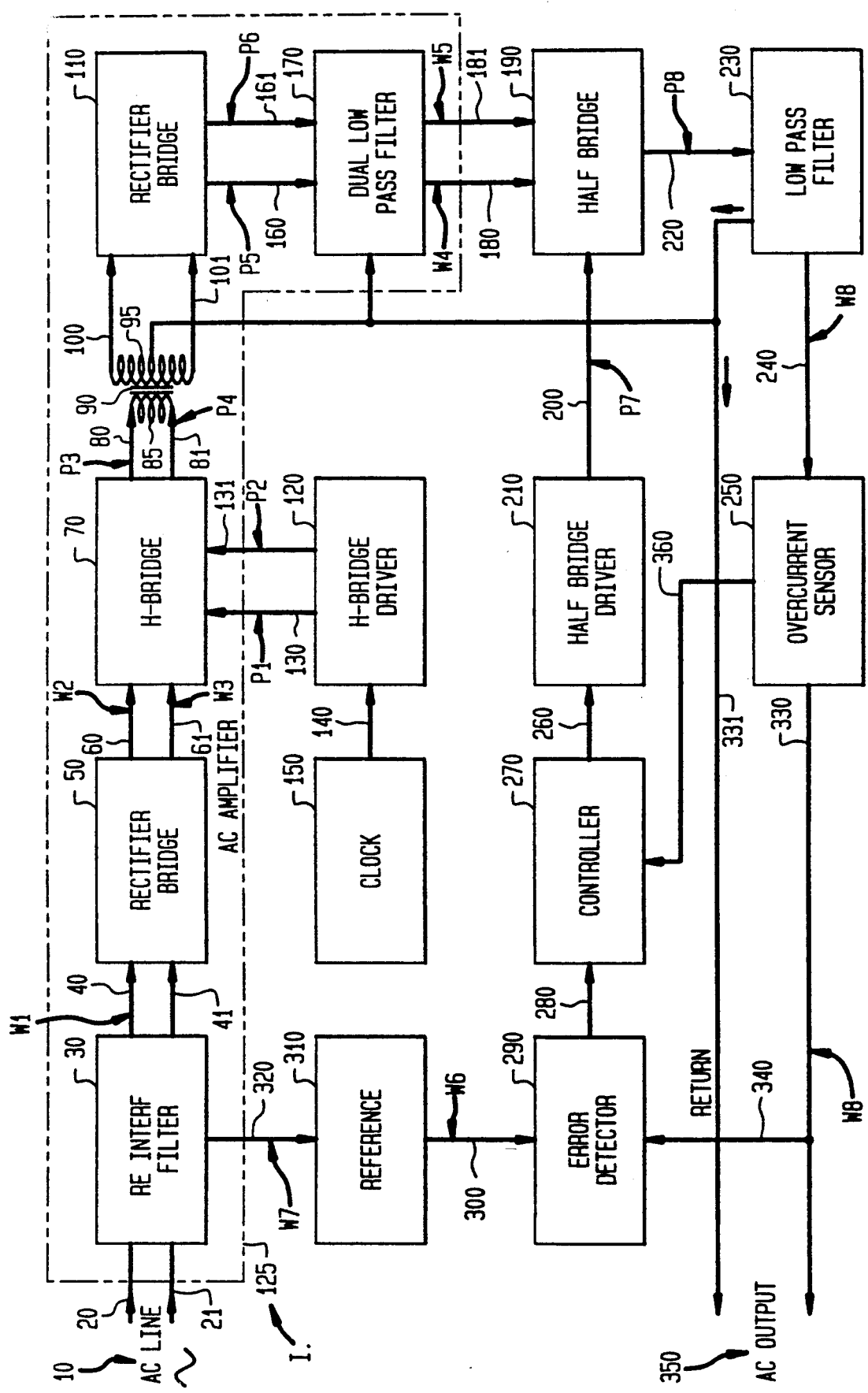
FIG. 1 is a block diagram of a solid state high frequency voltage control apparatus embodying the invention, adapted for stabilizing the AC voltage applied to a load from an alternating current source.
Figure 3:
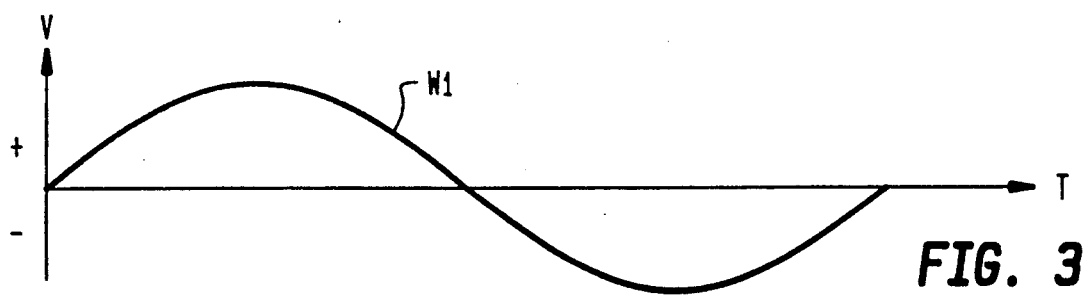
FIGS. 3 through 13 are graphic diagrams of waveforms and pulse trains employed in explaining the modes of operation of the invention.
Figure 4:
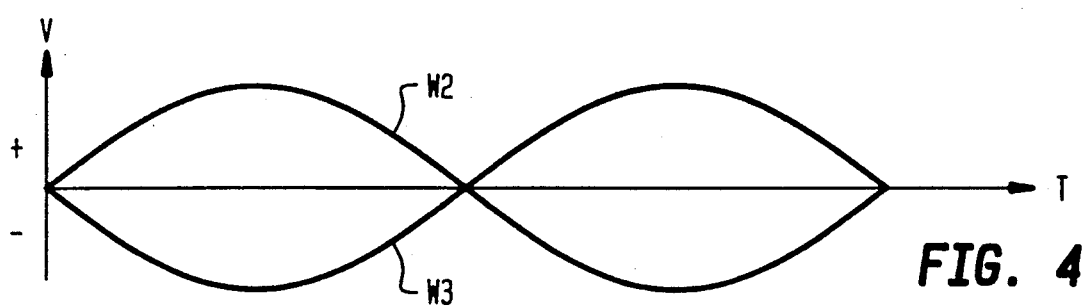

Referring now to the drawings wherein like reference characters designate like or corresponding parts throughout, there is illustrated in FIG. 1, a block diagram of a voltage stabilizer apparatus generally designated by Roman symbol I embodying the invention. In apparatus I., a source of sinusoidal AC line voltage 10 is applied through lines 20 and 21 to a radio frequency interference filter 30 which prevents noise frequencies from being injected into the circuit of apparatus I., and also prevents high frequency noise frequencies from being injected back into the AC line 20,21. A pair of lines 40 and 41 connected to the output of the filter 30 carry the filtered AC line voltage to a rectigier bridge 50 which provides full wave rectified voltage W2 and W3 via a pair of lines 60 and 61 to an H-bridge assembly 40, such as manufactured by International Rectifier Inc. or IXIS Company. FIG. 3 shows a wave form W1 of the sinusoidally shaped filtered AC voltage transmitted by lines 40, 41 to the bridge 50. FIG. 4 shows a positive and negative wave form W2 and W3 of the rectified voltage carried by the lines 60 and 61 to the H-bridge 70. In FIGS. 3 and 4 the voltage V is plotted against time T for a single cycle of alternation of the voltage.

Figure 5:
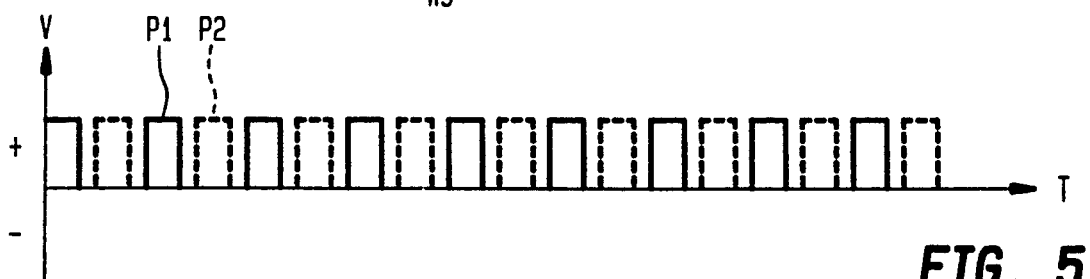
Figure 6:
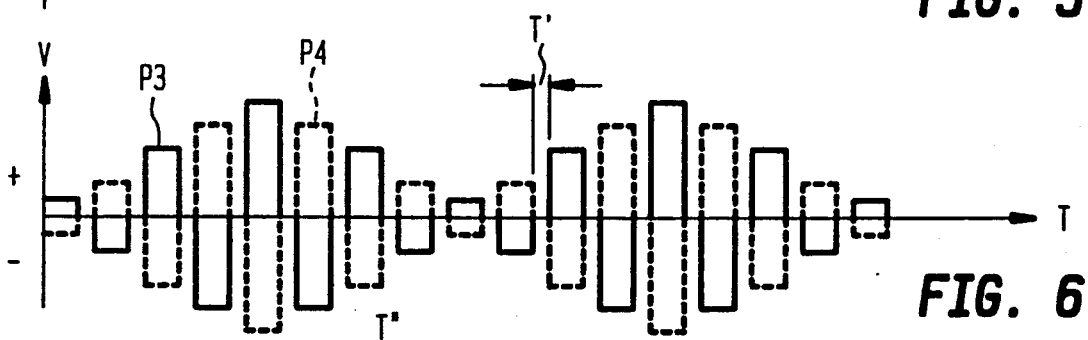

A clock 150 is a pulse generator which produces high frequency square wave pulses. The H-bridge driver 120 receives the clock pulses via a line 140. The H-bridge driver 120 produces two pulse trains P1 and P2 shown in solid and dotted lines respectively in FIG. 5. The pulses P1 are applied via a line 130 and pulses P2 are applied via a line 131, to respective diagonal pairs of four solid state switches in the H-bridge assembly 70. The pulses P1, P2 and the voltage signals W1, W2, W3 are combined in the H-bridge assembly 70 to generate pulses P3 and P4 (FIG. 6) having a sinusoidal envelope. The pulses P3, P4 are applied via lines 80, 81 to a primary winding 85 of a high frequency step-up transformer 90. The transformer 90 increases or amplifies the voltages of the pulses P3, P4 and they appear as amplified pulses on lines 100 and 101 of a secondary winding 95. The pulses P3 are shown in solid lines and pulses P4 are shown in dotted lines in FIG. 6. The symmetry and duty cycle of the signals P1, P2 generated by the H-bridge driver 120 will allow a deadtime T' between consecutive positive and negative pulses P3 on the line 80 and P4 on the line 81 and on lines 100, 101 as shown in FIG. 6, in order to compensate for the reverse recovery time of the four fast switching diodes constituting a rectifier bridge 110. The amplified pulses on the lines 100, 101 are applied to the rectifier bridge 110. The voltage ratio between the voltages on the line 80, 81 at the primary side of the transformer 90 and the amplified voltages on the lines 100, 101 at the secondary 95 of the transformer 90 is determined by the usable range of the AC input voltage 10 at the lines 20, 21. The filter 30, the rectifier bridge 50, the dual low pass filter 170, the H-bridge 70, the transformer 90 and the rectifier bridge 110 cooperate to constitute the AC voltage amplifier 125.

The rectifier bridge 110 provides two full wave rectified signals P5 and P6 on lines 160 and 161 to a dual low pass filter 170. The signals P5 and P6 are pulse trains shown by solid line and dotted lines respectively in FIG. 7. The time off or the "pause" T" between two consecutive pulses in the . pulse trains P5 and P6 on the lines 160 and 161 is short, approximately equal to the deadtime T' indicated in FIG. 6. This makes it possible to use inductor components of small size and low inductance values in the dual low pass filter 170. The purpose of the filter 170 is to provide two smooth full wave rectified signals W4 and W5 of opposite polarity on lines 180 and 181; see FIG. 8.

Figure 11:
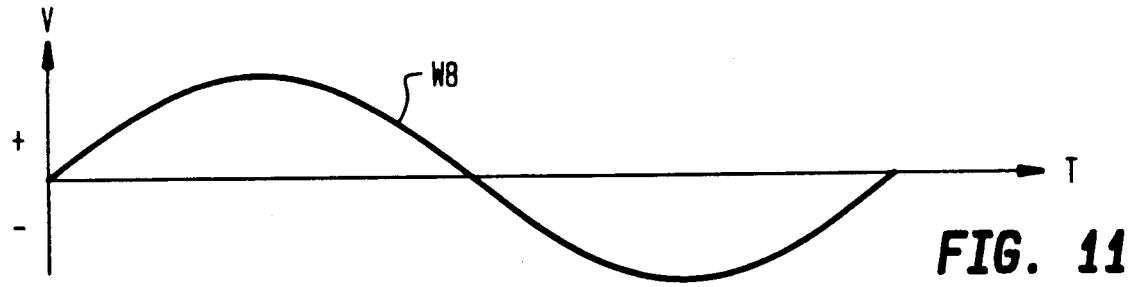
Figure 12:
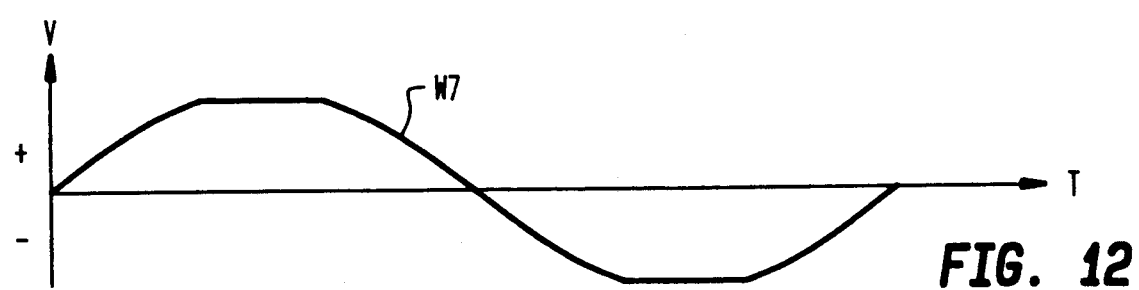
Figure 13:
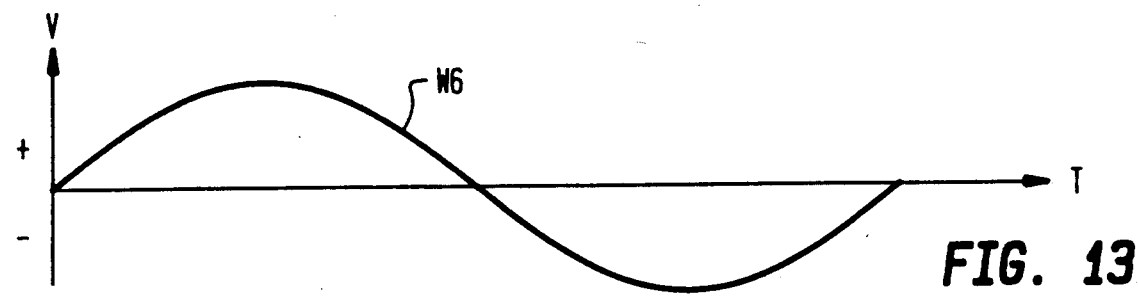

A reference device 310 provides on a line 300 an amplitude regulated, low distortion sinusoidal voltage having a waveform W6 shown in FIG. 13. The wave form W6 is synchronized in frequency and phase with the AC line voltage 10 obtained via a line 320 from the filter 30. The output W6 of the reference 310 on the line 300 as shown in FIG. 13 is a clean sinewave, even in the case where the AC line voltage 10 is distorted. One possible example of this is shown by waveforms W7 and W8 in FIGS. 12 and 11 respectively. In FIG. 12 the waveform W7 appearing on the line 320 is distorted from a true sinewave form. However the wave form W8 of the output voltage appearing on the lines 330, 331 is restored to true sinewave form. An AC voltage output 350 on the lines 330,331 is practically independent of the distortion contained in the AC input line voltage 10. Thus the apparatus performs a true line conditioning and isolating function.

An error detector 290 is connected to the reference 310 and an output line 330 via the line 300 and 340 respectively. If there is any error between the reference signal W6 (FIG. 13) on line 300 and the scaled down AC output voltage W8 (FIG. 11) on the lines 330 and 340, the error will be detected by the error detector 290. The voltage output of the error detector 290 is applied via a line 280 to a controller 270. The controller 270 will determine the time ratio between the voltages W4, W5 on lines 180, 181 (FIG. 8) in the pulsed output P8 (FIG. 10) on the line 220 of the half bridge assembly 190. This time ratio will be a function of the error output voltage passed by the line 280 to a controller 270.

Figure 9:
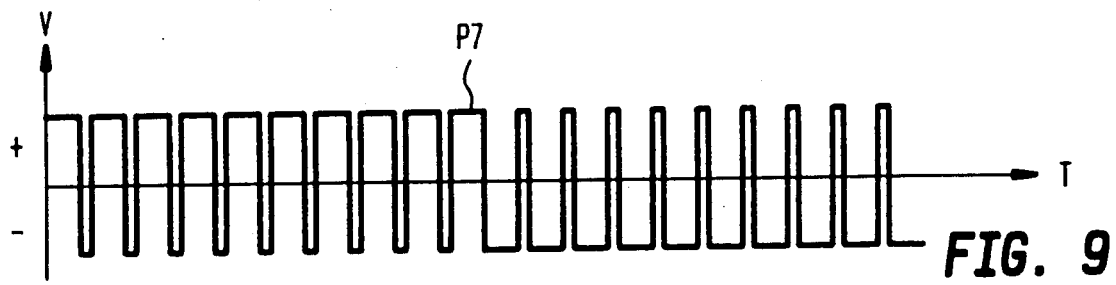

The output of the controller 270 is applied via a line 260 to a half bridge driver 210 whose output is connected via a line 200 to a half bridge 190. Lines 180, 181 are also connected to the half bridge 190. For a given error between the voltages W6 on the line 300 and voltages W8 on the line 340, the output pulses P7 of half bridge driver 210 on the line 200 may appear as shown in FIG. 9. The half bridge assembly 190 has an output P8 (see FIG. 10) which appears on an output line 220 connected to a low pass filter 230. The filter 230 averages out the AC output sinewave voltage W8 (FIG. 9) on a line 240 connected to an overcurrent sensor 250 and an output line 330 connected to the overcurrent sensor.

If the AC output current on line 330 increases due to a load fault above an acceptable limit, the overcurrent sensor 250 will send a signal to the controller 270 via a line 360 in order to shut off the half bridge assembly 190 and to cut off the AC output voltage 350. A manual reset may be provided to turn the apparatus on again after the load fault has been corrected.

Figure 2:
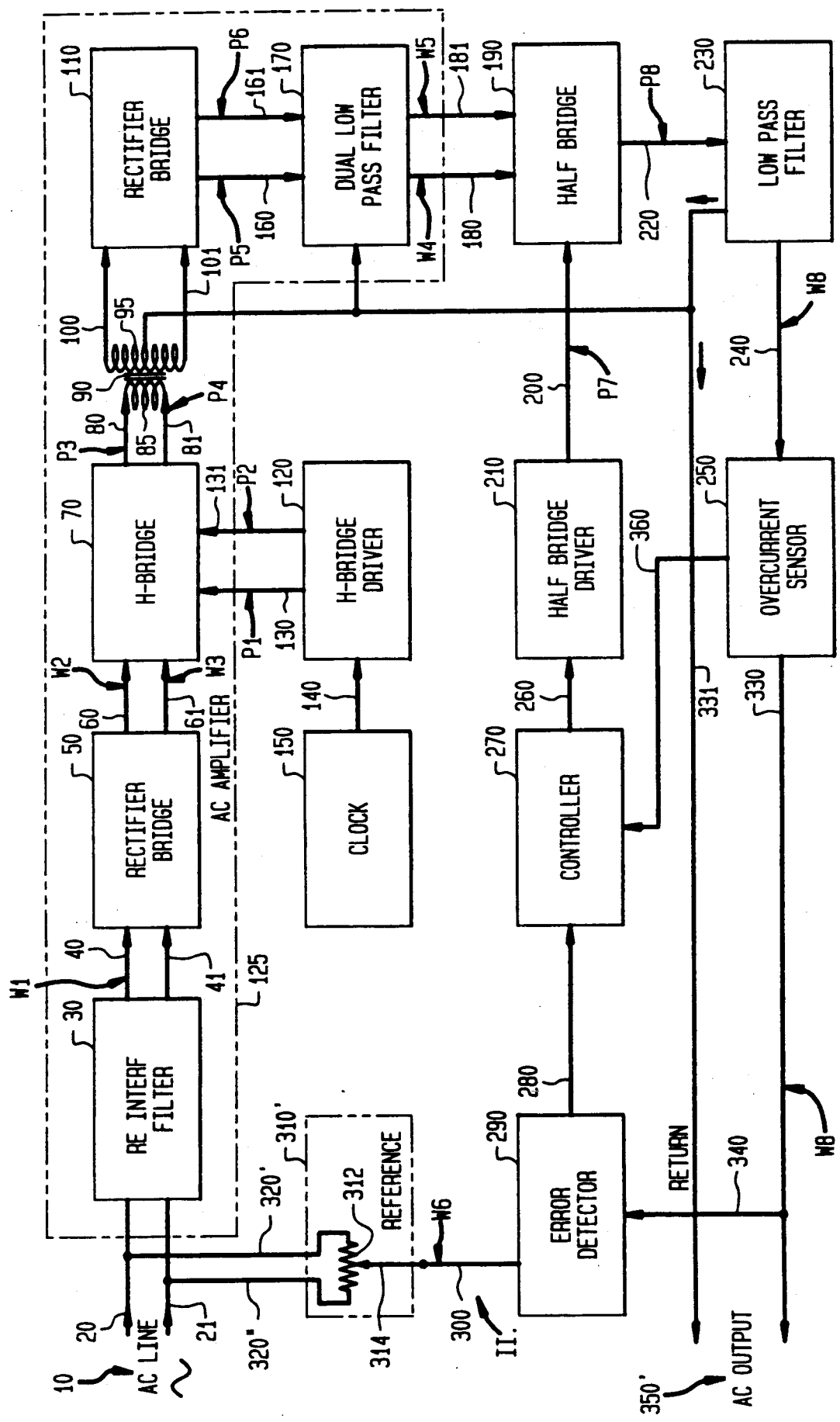
FIG. 2 is a block diagram of a solid state high frequency voltage control apparatus embodying the invention, adapted for controllably varying the AC voltage applied to a load from an alternating current source, and for maintaining a desired AC output voltage.

It will be noted that the apparatus I. performs true line conditioning functions, including stabilization, so that the AC output 350 has an extremely low level of distortion which is almost independent of larger levels of distortion of the AC input line voltage 10. In FIG. 2 is a block diagram of apparatus II which is a modification of the apparatus I. shown in FIG. 1. Apparatus II is adapted for controllably varying the AC voltage amplitude applied to a load from an alternating current source and at the same time maintaining the desired AC voltage applied to the load. In FIG. 2 components corresponding to those in FIG. 1 are identically numbered and have the same functions as described above. The principal differences between the apparatus II. of FIG. 2 and apparatus I. of FIG. 1 is replacement of the fixed reference 310 of FIG. 1 with a variable reference 310' in FIG. 2. The line 320 connecting filter 30 and reference 310 is replaced by lines 320' and 320" connecting reference 310' across AC input lines 20, 21. The reference 310' comprises a potentiometer 312 connected across lines 20, 21 and has a movable tap 314 which is connected directly to error detector 290 via line 300. In all other respects apparatus II. is identical to apparatus I.

Figure 7:
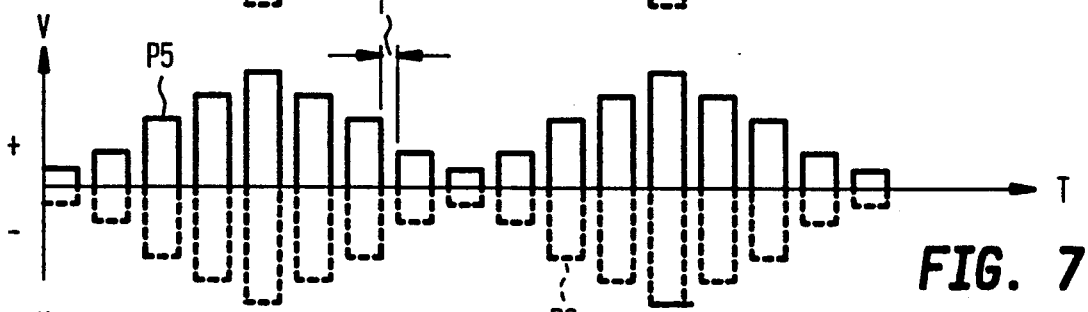

In apparatus II. the AC amplifier stage 125 operates as described above in connection with apparatus I. of FIG. 1, since it comprises the same components ie.the filter 30, the rectifier bridges 50 and 110, the H bridge 70, the transformer 90 and the dual low pass filter 170. The wave forms W1, W2, and W3 are the same as shown in FIGS. 3 and 4; pulse trains P3, P4, P5 and P6 are the same as shown in FIGS. 6 and 7. The potentiometer 312 of reference 310′ provides on line 300 a variable voltage whose wave form W6 (FIG. 13) is a scaled down replica of the AC input line voltage 10 derived from lines 20, 21 via lines 320′, 320″.

Figure 8:
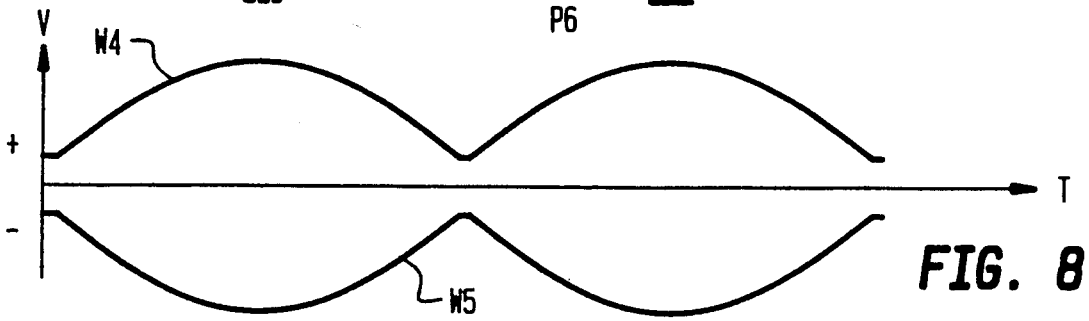
Figure 14:
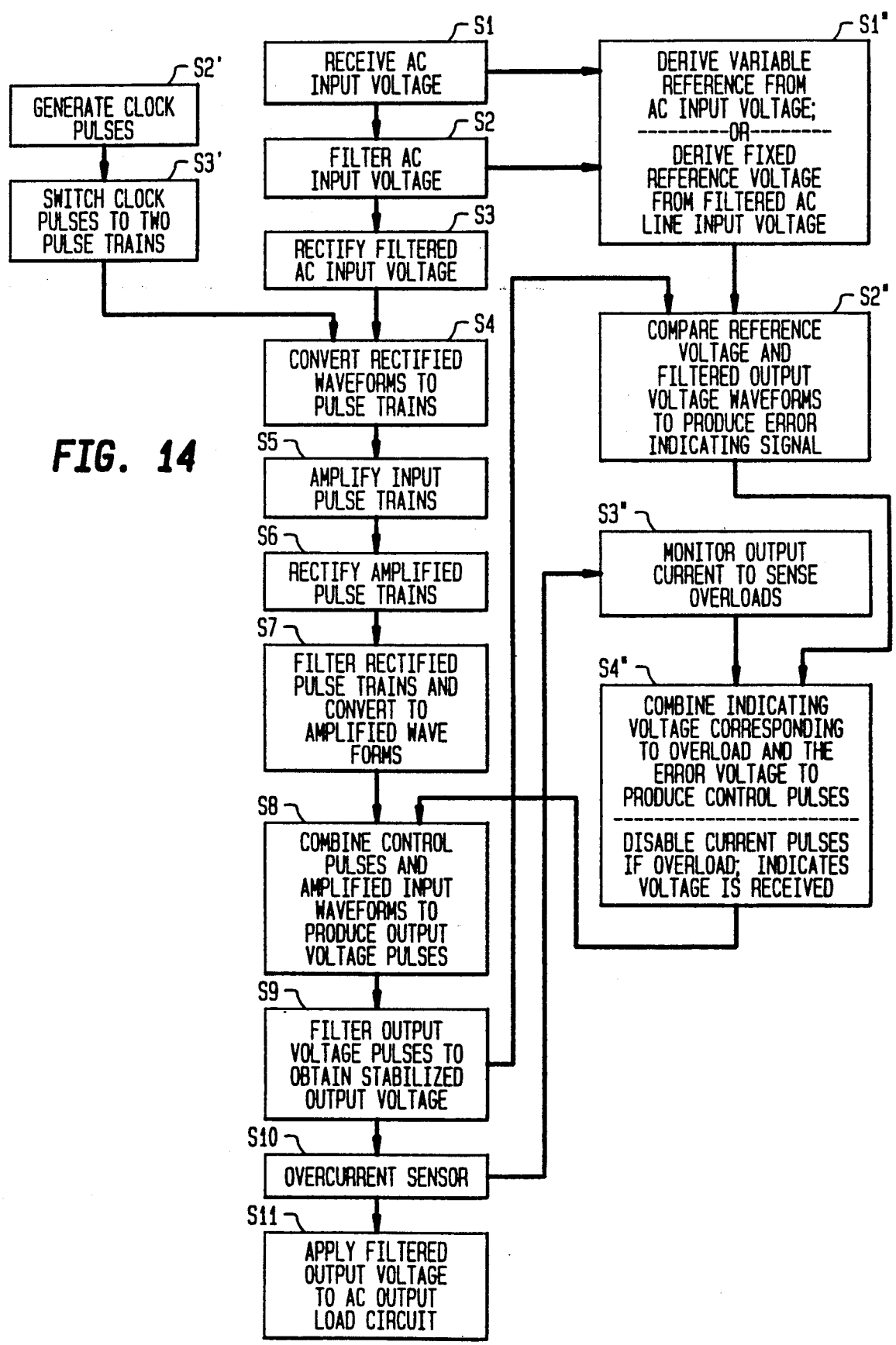
FIG. 14 is a flow chart listing successive stages or steps in operation of the invention.

The error detector 290 is connected to tap 314 of reference 310′ and output line 330 via lines 300 and 340. If there is any error between the reference signal W6 on line 300 (FIG. 13) and the scaled down AC output voltage W8 (FIG. 11) on lines 330 and 340, the 15 error will be detected by the error detector 290. In all further respects the controller 270, half bridge driver 210, dual low pass filer 170, half bridge 190, low pass filter 230 and current sensor are arranged in the same manner as shown in FIG. 1 and described above. The several components of the wave 20 forms W4, W5, W6, W7 and W8 in apparatus II. are the same as shown in FIGS. 8, 11, 12 and 13; and the pulse trains P1–P8 are the same as shown in FIGS. 5, 6, 7, 9 and 10. In addition the amplitude of the AC output voltage 350′ applied to the load can be varied as desired according to the selected adjustment of tap 314 in reference 310′. The mode of operation of the invention will now be summarized by explanation of the flow chart in FIG. 14, with particular reference to the diagrams of FIGS. 1–13. In step or stage S1 the AC line input voltage 10 is received on lines 20, 21. The line input voltage is passes through noise filter 30 in stage S2. The wave form W1 at the filter output 40, 41 is shown in FIG. 3. The AC line input voltage is rectified by rectifier bridge 50 in stage S3 and the wave forms W2 and W3 at the rectifier bridge output are shown in FIG. 4. Clock 150 generates clock pulses in stage S2′ and these are applied to H-bridge driver 120 in stage S3 to obtain two pulse trains P1, P2 (FIG. 5). The rectified wave forms W2, W3 (FIG. 4) are passed through H-bridge 70 in stage S4 along with pulse trains P1, P2 (FIG. 5) to obtain the pulse train outputs P3, P4 shown in FIG. 6. The pulse trains P3, P4 have sinusoidal envelopes. Pulse trains P3, P4 are stepped-up in voltage or amplified by the high frequency transformer 90 in stage S5. The transformer output is rectified in stage S6 by the rectifier bridge 110 whose output P5 and P6 (FIG. 7) is passed to dual low pass filter 170. In stage S7 the rectified amplified pulses P5, P6 are filtered to produce the wave forms W4, W5 (FIG. 8).

In stage S1″ a variable sinusoidal reference voltage is derived firectly from the line voltage 10 by a potentiometer 312 shown in FIG. 2. Alternatively a sinusoidal reference voltage of fixed wave form is derived from filter 30 as shown in FIG. 1. In either arrangement of the reference derivation, the reference wave form W6 (FIG. 13) is applied in stage S2″ to error detector 290. Also applied to error detector 290 in stage S2″ is the output voltage waveform W8 (FIG. 11). The error detector compares the amplitude of the applied wave forms to produce error indicating signals in stage S2″.

Figure 10:
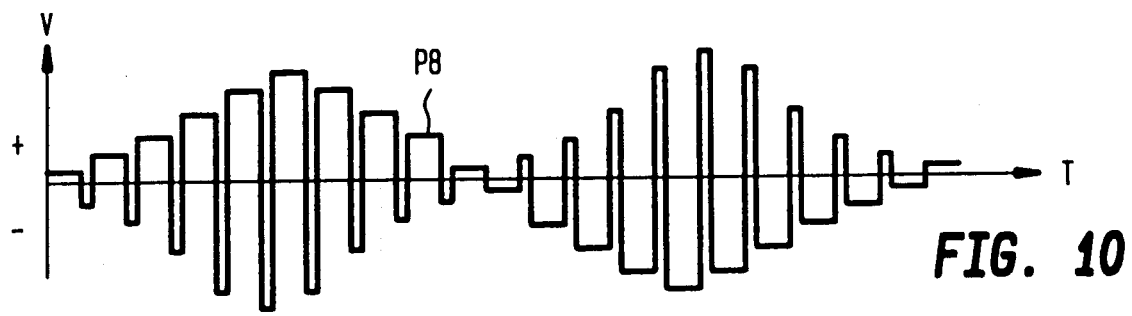

An overcurrent sensor 250 produces voltage signals at stage S3″ when it senses overload currents are being drawn by the load in which output 350 or 350″ is fed. The sensor applies the overload signal voltage to controller 270 in stage S4″. The error detector also applies the error indicating signals to the controller 270 in stage S4″. The two signals are combined at the controller which produces control pulses P7 (FIG. 9). The control pulses P7 are passed through the half bridge driver 210 to half bridge 190 in stage S8 along with the amplified, filtered, rectified wave forms from stage S7. In stage S8 are produced the output voltage pulses P8 (FIG. 10). The output voltage pulses P8 are applied to low pass filter 230 in stage S9. The filter 230 averages the input pulses P8 to produce stabilized output voltage wave form W8. The wave form W8 has a wave shape which is no larger in distortion then any distortion in the AC input line. Wave form W8 has an amplitude which depends on the setting of the variable voltage reference 310′ (FIG. 2). The output current on the line 240 is also applied to overcurrent sensor 250 in stage S3″ to sense overload currents. The voltage output W8 is also applied to error detector 290 in stage S2″ along with reference pulses W6 to obtain the error indicating pulses. Finally the voltage output wave form W8 is applied in stage S10 to the output 350 or 350′ of apparatus I. and II. for application to an external load.

It should be understood that the foregoing relates to only a limited number of preferred embodiments of the invention which have been by way of example only, and that is intended cover all changes and modifications of the examples of the inventin herein chosed for the purposes of the disclosure, which do not constitute departures from the spirit and scope of the inventon.

What is claimed is:

1. Apparatus for producing a stabilized alternating voltage output for application to a load, from an alternating voltage input subject to distortion, comprising:

input lines for supplying alternating input voltage having ideally a sinusoidal wave form but subjected to distortion;

first conversion means connected in circuit with said input lines for generating an amplified voltage output having a sinusoidal envelope corresponding to that of said input voltage;

second conversion means connected in circuit with said first conversion means to convert said amplified voltage output to said stabilized alternating voltage output;

output lines for applying said alternating voltage output to said load;

a reference voltage generator connected in circuit with said input lines for producing a reference voltage which has an ideal sinosoidal form and synchronized in phase and frequency with said AC input voltage;

error detection means connected between said reference voltage generator and said output lines for producing error indicating signals corresponding to differences in amplitude frequency and phase between said reference voltage and said voltage output; and control means connected to said error detection means for generating control pulses corresponding to said error indicating signals, and further connected to said second conversion means, so that said alternating voltage output is stabilized and corresponds to said ideal sinusoidal wave form of said input voltage free of said distortion in frequency, phase and amplitude.

2. Apparatus as claimed in claim 1, wherein said reference voltage generator comprises voltage adjusting means so that said reference voltage varies in accordance with settings of said voltage adjusting means, whereby said alternating voltage output varies in amplitude in accordance with setting of said voltage adjustment means.

3. Apparatus as claimed in claim 1, further comprising overcurrent sensing means in circuit with said output lines and said control means, said sensing means being responsive to excessive current drawn by said load to apply an overcurrent signal to said control means, so that said control pulses stop generation of said alternating voltage output by said second conversion means.

4. Apparatus as claimed in claim 3, wherein said reference voltage generator comprises voltage adjusting means so that said reference voltage varies in accordance with settings of said voltage adjusting means, and whereby said alternating voltage output varies in amplitude in accordance with said settings of said voltage adjustment means.

5. Apparatus as claimed in claim 4, wherein said voltage adjusting means comprises a potentiometer connected across said input lines, and a movable tap connected to said error detection means.

6. Apparatus as claimed in claim 5, wherein said tap is manually movable so that manual adjustment of said settings effects corresponding variations in said amplitude of said alternating voltage output.

7. Apparatus as claimed in claim 1, further comprising a noise filter in circuit with said input lines to prevent injection of noise frequencies into said first conversion means, said reference voltage generator being connected to said noise filter so that said filter passes said alternating input voltage to said reference voltage generator free of said noise frequencies.

8. Apparatus as claimed in claim 7, wherein said first conversion means comprises an H-bridge means so that said amplified voltage pulses are bipolar.

9. Apparatus as claimed in claim 8, wherein said first conversion means compises dual low pass filter means to convert said amplified bipolar pulsed voltage to bipolar sinusoidal voltage wave forms, and said apparatus further including bridge means to combine said bipolar voltage with said control pulses to produce output voltage pulses.

10. Apparatus as claimed in claim 9, wherein said second conversion means comprises other low pass filter means for converting said output voltage pulses to said alternating voltage output.

11. Apparatus as claimed in claim 10, further comprising overcurrent sensing means in circuit with said output lines and said control means, said sensing means being responsive to excessive current drawn by said load to apply an overcurrent signal to said control means, so that said control pulses stop generation of said alternating voltage output by said second conversion means.

12. Apparatus as claimed in claim 11, wherein said reference voltage generator comprises voltage adjusting means so that said reference voltage varies in accordance with settings of said voltage adjusting means, and so that said alternating voltage output varies in amplitude in accordance with setting of said voltage adjustment means.

* * * * *